(12) United States Patent
Kim et al.

(10) Patent No.: US 9,295,047 B2
(45) Date of Patent: Mar. 22, 2016

(54) METHOD FOR TRANSMITTING AND RECEIVING DOWNLINK CONTROL INFORMATION IN A WIRELESS COMMUNICATION SYSTEM AND APPARATUS FOR THE SAME

(75) Inventors: Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 158 days.

(21) Appl. No.: 14/003,425

(22) PCT Filed: Feb. 20, 2012

(86) PCT No.: PCT/KR2012/001248
§ 371 (c)(1),
(2), (4) Date: Sep. 5, 2013

(87) PCT Pub. No.: WO2012/148076
PCT Pub. Date: Nov. 1, 2012

(65) Prior Publication Data
US 2013/0336279 A1 Dec. 19, 2013

Related U.S. Application Data

(60) Provisional application No. 61/480,374, filed on Apr. 29, 2011.

(51) Int. Cl.
*H04W 72/04* (2009.01)
*H04L 5/00* (2006.01)
*H04W 48/12* (2009.01)
*H04W 28/06* (2009.01)

(52) U.S. Cl.
CPC .......... *H04W 72/042* (2013.01); *H04L 5/0094* (2013.01); *H04W 48/12* (2013.01); *H04W 28/06* (2013.01)

(58) Field of Classification Search
None
See application file for complete search history.

(56) References Cited

U.S. PATENT DOCUMENTS

2010/0260081 A1  10/2010  Damnjanovic et al.
2011/0044391 A1   2/2011  Ji et al.
2011/0205978 A1*  8/2011  Nory et al. ............... 370/329

FOREIGN PATENT DOCUMENTS

EP    1 204 219 A2    5/2002
EP    2346295 A1      7/2011

OTHER PUBLICATIONS

3GPP TS 25.214 V10.2.0, "3rd Generation Partnership Project; Technical Specification Group Radio Access Network; Physical layer procedures (FDD) (Release 10)", Mar. 2011, pp. 1-100.

*Primary Examiner* — Diane Lo
(74) *Attorney, Agent, or Firm* — Birch, Stewart, Kolasch & Birch, LLP (57) ABSTRACT

A method for receiving a downlink signal in a user equipment of a wireless communication system from a base station comprises the steps of receiving control information from either a downlink control channel or a legacy downlink control channel in accordance with a previously set condition; and receiving a downlink shared channel or a legacy downlink shared channel on the basis of the control information, wherein the downlink control channel is received through a data region of a subframe, and the legacy downlink control channel is received through a control region of the subframe, the control information of the downlink control channel includes allocation information of the downlink shared channel, and the control information of the legacy downlink control channel includes allocation information of the downlink shared channel or the legacy downlink shared channel.

4 Claims, 9 Drawing Sheets

Fig. 1

E-UMTS

Fig. 2

(a) Control-Plane Protocol Stack (b) User-Plane Protocol Stack

METHOD FOR TRANSMITTING AND RECEIVING DOWNLINK CONTROL INFORMATION IN A WIRELESS COMMUNICATION SYSTEM AND APPARATUS FOR THE SAME

This application is the National Phase of PCT/KR2012/001248 filed on Feb. 20, 2012, which claims priority under 35 U.S.C. 119(e) to U.S. Provisional Application No. 61/480,374 filed on Apr. 29, 2011, all of which are hereby expressly incorporated by reference into the present application.

TECHNICAL FIELD

The present invention relates to a wireless communication system, and more particularly, to a method for transmitting and receiving downlink control information in a wireless communication system and an apparatus for the same.

BACKGROUND ART

A 3rd generation partnership project long term evolution (hereinafter, referred to as 'LTE') communication system which is an example of a wireless communication system to which the present invention can be applied will be described in brief.

Figure 1:
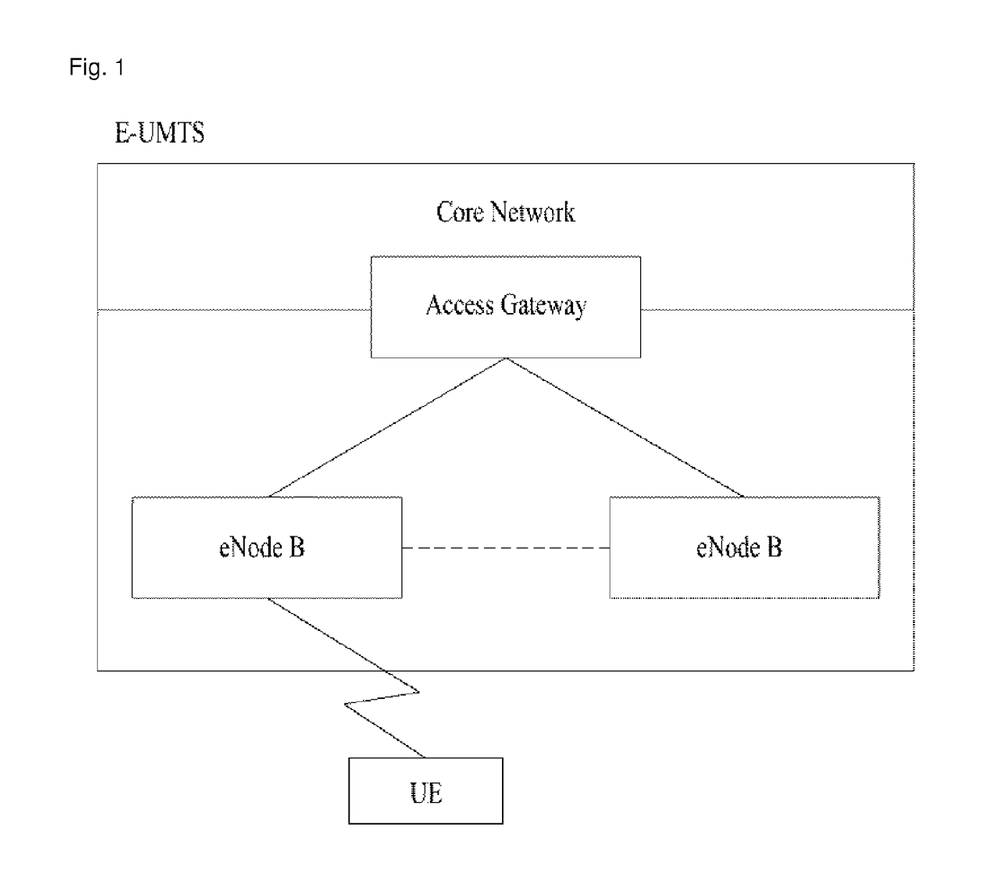
FIG. 1 is a diagram illustrating a network structure of an Evolved Universal Mobile Telecommunications System (E-UMTS) which is an example of a mobile communication system.

FIG. 1 is a diagram illustrating a network structure of an Evolved Universal Mobile Telecommunications System (E-UMTS) which is an example of a wireless communication system. The E-UMTS system is an evolved version of the conventional UMTS system, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (eNode B and eNB), and an Access Gateway (AG) which is located at an end of a network (E-UTRAN) and connected to an external network. The base stations may simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to indicate time and frequency domains to which data will be transmitted and information related to encoding, data size, hybrid automatic repeat and request (HARM). Also, the base station transmits uplink (UL) scheduling information of uplink data to the corresponding user equipment to indicate time and frequency domains that can be used by the corresponding user equipment, and information related to encoding, data size, HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

DISCLOSURE OF INVENTION

Technical Problem

Accordingly, based on the aforementioned discussion, an object of the present invention is to provide a method for transmitting and receiving downlink control information in a wireless communication system and an apparatus for the same, which substantially obviate one or more problems due to limitations and disadvantages of the related art.

Solution to Problem

To achieve these objects and other advantages and in accordance with the purpose of the invention, as embodied and broadly described herein, in one aspect of the present invention, a method for receiving a downlink signal in a user equipment of a wireless communication system from a base station comprises the steps of receiving control information from either a downlink control channel or a legacy downlink control channel in accordance with a previously set condition; and receiving a downlink shared channel or a legacy downlink shared channel on the basis of the control information, wherein the downlink control channel is received through a data region of a subframe, and the legacy downlink control channel is received through a control region of the subframe, the control information of the downlink control channel includes allocation information of the downlink shared channel, and the control information of the legacy downlink control channel includes allocation information of the downlink shared channel or the legacy downlink shared channel.

The previously set condition means a case where signal quality of the downlink control channel is less than a threshold value, a case where decoding of the downlink control channel is failed within the range that exceeds the number of previously set times, or a case where decoding of the downlink control channel is failed for more than a subframe which is previously set. If the previously set condition is satisfied, the control information is received from the legacy downlink control channel.

In another aspect of the present invention, a user equipment in a wireless communication system comprises a wireless communication module for receiving a downlink control channel or a legacy downlink control channel from a base station in accordance with a previously set condition; and a processor for acquiring control information by decoding the received downlink control channel or legacy downlink control channel, wherein the wireless communication module receives a downlink shared channel or a legacy downlink shared channel from the base station on the basis of the control information, receives the downlink control channel through a data region of a subframe and receives the legacy downlink control channel through a control region of the subframe, and the control information of the downlink control channel includes allocation information of the downlink shared channel, and the control information of the legacy downlink control channel includes allocation information of the downlink shared channel or the legacy downlink shared channel.

The processor controls the wireless communication module to receive the legacy downlink control channel if signal quality of the downlink control channel is less than a threshold value, if decoding of the downlink control channel is failed within the range that exceeds the number of previously set times, or if decoding of the downlink control channel is failed for more than a subframe which is previously set.

The control information included in the legacy downlink control channel may be the same as the control information included in the downlink control channel of which decoding has been failed.

Also, the legacy downlink control channel is transmitted from a subframe, which is previously set, in a unit of a specific number of radio frames. Preferably, the subframe, which is previously set, is the subframe to which broadcast information is transmitted.

Advantageous Effects of Invention

According to the embodiment of the present invention, the user equipment can effectively receive a downlink signal in a wireless communication system.

It is to be understood that the advantages that can be obtained by the present invention are not limited to the aforementioned advantages and other advantages which are not mentioned will be apparent from the following description to the person with an ordinary skill in the art to which the present invention pertains.

MODE FOR THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to a 3GPP system.

In this specification, although the embodiment of the present invention will be described based on the LTE system and the LTE-A system, the LTE system and the LTE-A system are only exemplary and the present invention may be applied to all communication systems corresponding to the aforementioned definition.

Figure 2:
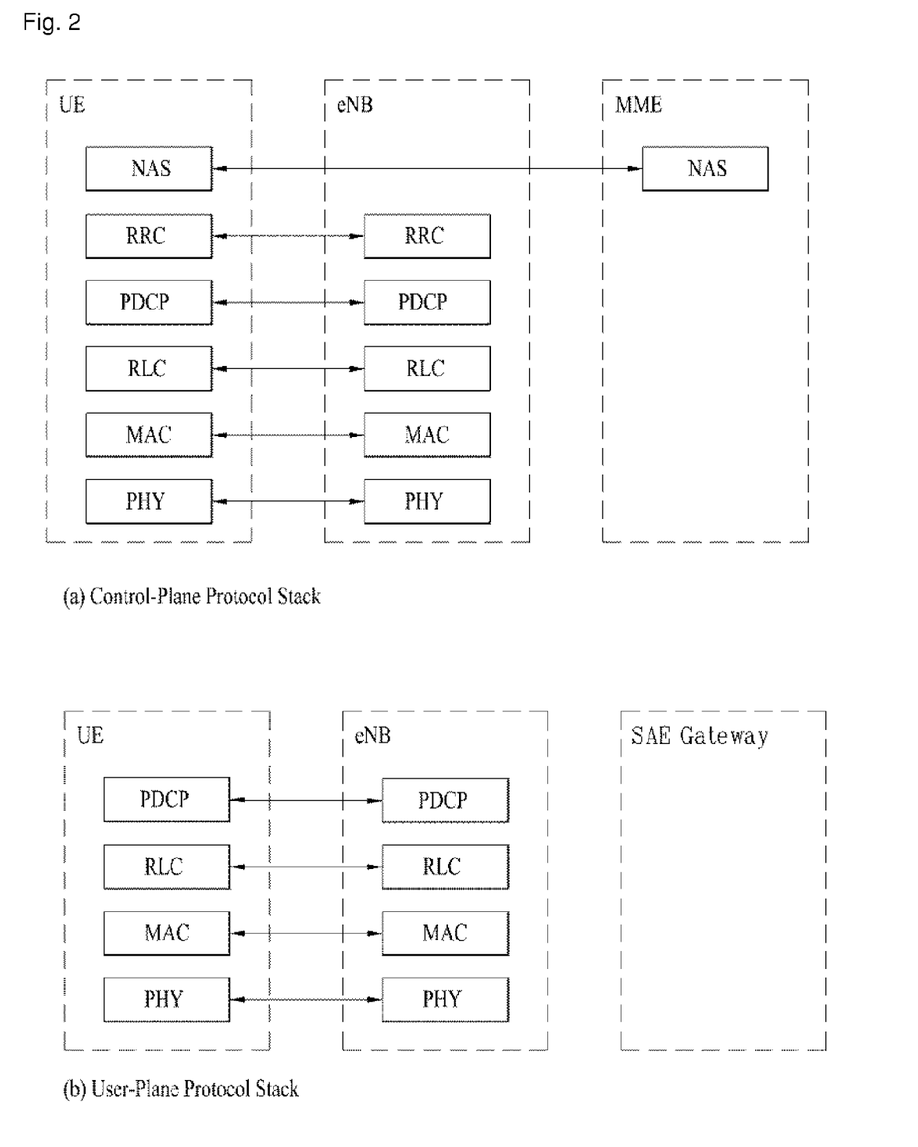
FIG. 2 is a diagram illustrating structures of a control plane and a user plane of a radio interface protocol between a user equipment and E-UTRAN based on the 3GPP radio access network standard.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC) layer above the MAC layer via logical channels. The RLC layer of the second layer supports reliable data transfer. The RLC layer may be implemented as a functional block inside the MAC layer. In order to effectively transmit IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers to be in charge of controlling the logical, transport and physical channels. In this case, the radio bearer (RB) means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

One cell constituting a base station (eNB) is set to one of bandwidths of 1.25, 2.5, 5, 10, 15, and 20 Mhz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
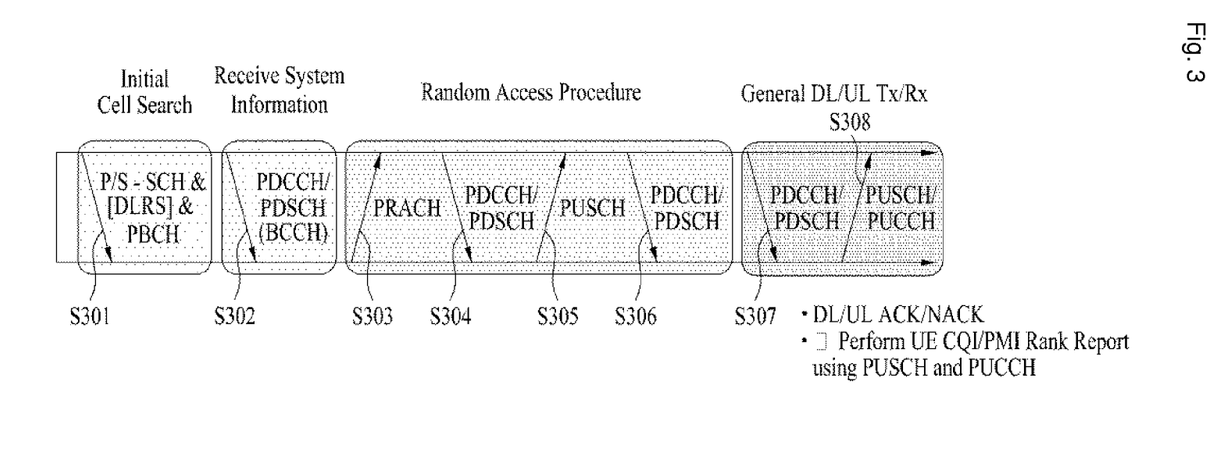
FIG. 3 is a diagram illustrating physical channels used in a 3GPP system and a general method for transmitting a signal using the physical channels.

FIG. 3 is a diagram illustrating physical channels used in a 3GPP system and a general method for transmitting a signal using the physical channels.

The user equipment performs initial cell search such as synchronizing with the base station when it newly enters a cell or the power is turned on (S301). To this end, the user equipment synchronizes with the base station by receiving a primary synchronization channel (P-SCH) and a secondary synchronization channel (S-SCH) from the base station, and acquires information of cell ID, etc. Afterwards, the user equipment may acquire broadcast information within the cell by receiving a physical broadcast channel from the base station. Meanwhile, the user equipment may identify the status of a downlink channel by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S302).

Meanwhile, if the user equipment initially accesses the base station, or if there is no radio resource for signal transmission, the user equipment may perform a random access procedure (RACH) for the base station (S303 to S306). To this end, the user equipment may transmit a preamble of a specific sequence through a physical random access channel (PRACH) (S303 and S305), and may receive a response message to the preamble through the PDCCH and the PDSCH corresponding to the PDCCH (S304 and S306). In case of a contention based RACH, a contention resolution procedure may be performed additionally.

The user equipment which has performed the aforementioned steps receives the PDCCH/PDSCH (S307) and transmits a physical uplink shared channel (PUSCH) and a physical uplink control channel (PUCCH) (S308), as a general procedure of transmitting uplink/downlink signals. In particular, the user equipment receives downlink control information (DCI) through the PDCCH. In this case, the DCI includes control information such as resource allocation information for the user equipment, and has different formats depending on its usage.

In the mean time, control information transmitted from the user equipment to the base station or received from the base station to the user equipment through the uplink includes downlink/uplink ACK/NACK signals, a channel quality indicator (CQI), a precoding matrix index (PMI), and a rank indicator (RI). In case of the 3GPP LTE system, the user equipment may transmit the aforementioned control information such as CQI/PMI/RI through the PUSCH and/or the PUCCH.

Figure 4:
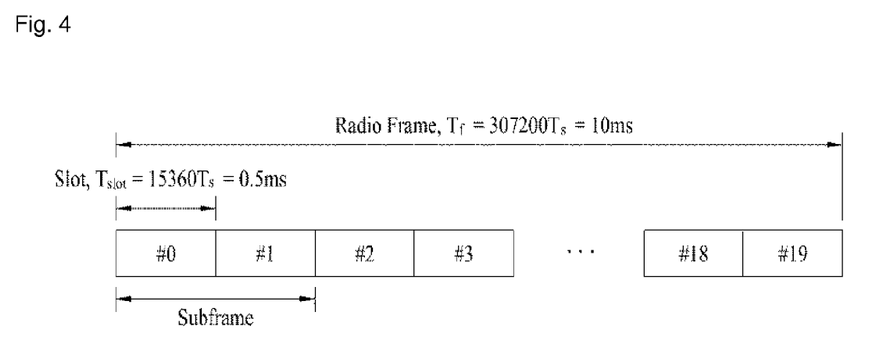
FIG. 4 is a diagram illustrating a structure of a radio frame used in a 3GPP system.

FIG. 4 is a diagram illustrating a structure of a radio frame used in an LTE system.

Referring to FIG. 4, the radio frame has a length of 10 ms (327200×Ts) and includes 10 subframes of an equal size. Each sub frame has a length of 1ms and includes two slots. Each slot has a length of 0.5 ms (15360×Ts). In this case, Ts represents a sampling time, and is expressed by Ts=1/(15 kHz×2048)=3.2552×10$^{-8}$ (about 33 ns). The slot includes a plurality of OFDM symbols in a time domain, and includes a plurality of resource blocks (RBs) in a frequency domain. In the LTE system, one resource block includes twelve (12) subcarriers×seven (or six) OFDM symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols included in the slot.

Figure 5:
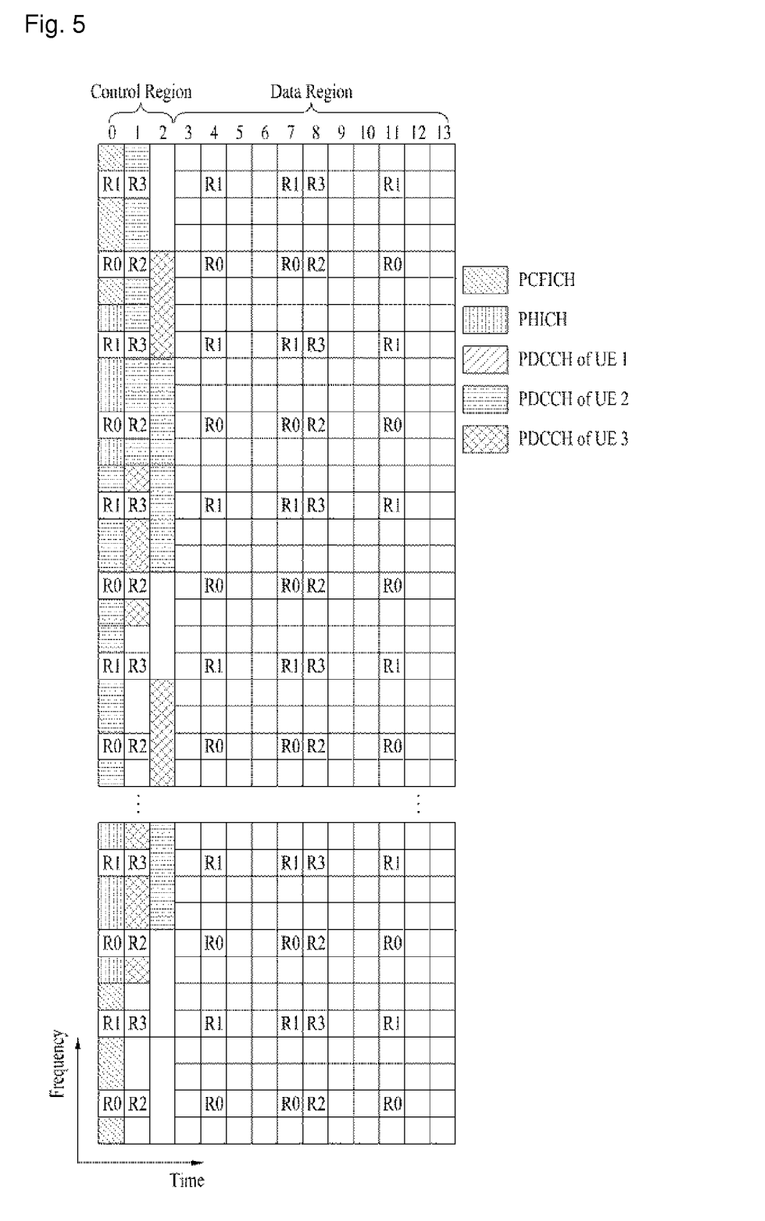
FIG. 5 is a diagram illustrating a structure of a downlink radio frame used in an LTE system.

FIG. 5 is a diagram illustrating a control channel included in a control region of one subframe in a downlink radio frame.

Referring to FIG. 5, the subframe includes fourteen (14) OFDM symbols. First one to three OFDM symbols are used as the control region in accordance with subframe configuration, and the other thirteen to eleven OFDM symbols are used as the data region. In FIG. 5, R1 to R4 represent reference signals (RS) (or pilot signals) of antennas 0 to 3. The RS is fixed by a given pattern within the subframe regardless of the control region and the data region. The control channel is allocated to a resource to which the RS is not allocated in the control region, and a traffic channel is also allocated to a resource to which the RS is not allocated in the data region. Examples of the control channel allocated to the control region include a Physical Control Format Indicator Channel (PCFICH), a Physical Hybrid-ARQ Indicator Channel (PHICH), and a Physical Downlink Control Channel (PDCCH).

The PCFICH notifies the user equipment of the number of OFDM symbols used in the PDCCH per subframe. The PCFICH is located in the first OFDM symbol and configured prior to the PHICH and the PDCCH. The PCFICH includes four resource element groups (REG), each REG being distributed in the control region based on cell identity (cell ID). One REG includes four resource elements (REs). The RE represents a minimum physical resource defined by one subcarrier×one OFDM symbol. The PCFICH value indicates a value of 1 to 3 or a value of 2 to 4 depending on a bandwidth, and is modulated by Quadrature Phase Shift Keying (QPSK).

The PHICH is a physical hybrid-automatic repeat and request (HARQ) indicator channel and is used to carry HARQ ACK/NACK signals for uplink transmission. Namely, the PHICH represents a channel where DL ACK/NACK information for UL HARQ is transmitted. The PHICH includes one REG, and is cell-specifically scrambled. The ACK/NACK signals are indicated by 1 bit, and are modulated by binary phase shift keying (BPSK). The modulated ACK/NACK are spread by a spreading factor (SF)=2 or 4. A plurality of PHICHs may be mapped with the same resource and constitute a PHICH group. The number of PHICHs multiplexed in the PHICH group is determined by the number of spreading codes. The PHICH (group) is repeated three times to obtain diversity gain in the frequency domain and/or the time domain.

The PDCCH is allocated to first n number of OFDM symbols of the subframe, wherein n is an integer greater than 1 and is indicated by the PCIFCH. The PDCCH includes one or more CCEs. The PDCCH notifies each user equipment or user equipment group of information related to resource allocation of transport channels, i.e., a paging channel (PCH) and a downlink-shared channel (DL-SCH), uplink scheduling grant, HARQ information, etc. The paging channel (PCH) and the downlink-shared channel (DL-SCH) are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted by being included in the PDCCH. For example, it is assumed that a specific PDCCH is CRC masked with radio network temporary identity (RNTI) called "A," and information of data transmitted using a radio resource (for example, frequency location) called "B" and transmission format information (for example, transport block size, modulation mode, coding information, etc.) called "C" is transmitted through a specific subframe. In this case, one or more user equipments located in a corresponding cell monitor the PDCCH using their RNTI information, and if there are one or more user equipments having RNTI called "A", the user equipments receive the PDCCH, and receive the PDSCH indicated by "B" and "C" through information of the received PDCCH.

Meanwhile, in the 3GPP LTE system, a downlink subframe mainly includes a PDCCH and a PDSCH, and if a cell B corresponds to the same LTE system, a cell A and subframe format are used. In order that downlink transmission from the cell A avoids interference downlink transmission from the cell B, it may be considered that the cell A and the cell B respectively perform transmission from their respective subframes different from each other. Namely, limited subframe resources are used divisionally by a time division mode. An almost blank subframe (ABS) which is being recently discussed is an example of the aforementioned interference avoidance, and a subframe designated as the ABS is set to transmit a common reference signal (CRS) only. However, this greatly reduces resource usage efficiency. Accordingly, it may be more considered that the two cells share the same subframe if possible but frequency resources are divided from space resources. Alternatively, it may be considered that these two approach methods may efficiently be combined with each other.

As another method for reducing inter-cell interference, it may be considered a method for minimizing interference on the cell B by spatially dividing a data channel of the cell A and arranging the divided channels at different directions from each other. In other words, precoding is applied to the cell A to avoid interference and at the same time direct a transport beam in a corresponding direction, whereby the transport beam is normally transmitted to a specific user equipment. As a result, interference of the data channel of the cell A on a data channel of the cell B may be reduced remarkably.

However, a control channel is generally transmitted over an entire system band and decoded using a common reference signal (CRS). Accordingly, if precoding is applied to the control channel, information on precoding performed for detection and decoding by a receiver is required. Since the precoding information is transmitted through the control channel, the control channel cannot be decoded. Accordingly, to decode the control channel, a separate reference signal for normally decoding the control channel is required. In this case, complexity in transmission and reception may be increased.

In this respect, as another method for avoiding inter-cell interference, the control channel such as the PCFICH or the PHICH is decoded using the CRS in the same manner as the existing PDCCH. However, different methods should be used depending on types of the control channels. For example, the PDCCH may be transmitted to a specific position of a PDSCH resource region, and the PCFICH and the PHICH may be transmitted to either the first symbol or the first to fourth symbols.

Also, it may be considered that the PCFICH, the PHICH and the CRS are located at the first OFDM symbol and the PDCCH is transmitted after the third symbol. Uplink grant or downlink grant transmitted through the PDCCH may be located at the second slot not the first slot. Alternatively, the downlink grant may be located at the first slot only and the uplink grant may be located at the second slot only. It is assumed that important system information, i.e., BCH, PCH and SCH transmitted through a broadcasting format is managed in the same manner as the existing method.

In this case, a control channel newly suggested unlike the existing PDCCH is referred to as an enhanced PDCCH or E-PDCCH. The E-PDCCH is characterized in that a CRS based transmit diversity or spatial multiplexing (SM) scheme may be applied to the E-PDCCH and that the E-PDCCH may be operated based on a DM-RS which is a user equipment specific reference signal. The same precoding may be applied to the E-PDCCH and the PDSCH, whereby interference may be minimized at the corresponding subframe of the cell B.

The control information such as the PCFICH located at the first symbol of the cell A may still cause interference. However, beamforming may be performed for the PDCCH and the PDSCH, which are main factors of interference, whereby interference may be reduced remarkably. Also, since the PCFICH performs inter-cell hopping based on cell ID, robustness a little exists in inter-cell interference.

Hereinafter, detailed features of the E-PDCCH will be described based on the aforementioned concept.

Figure 6:
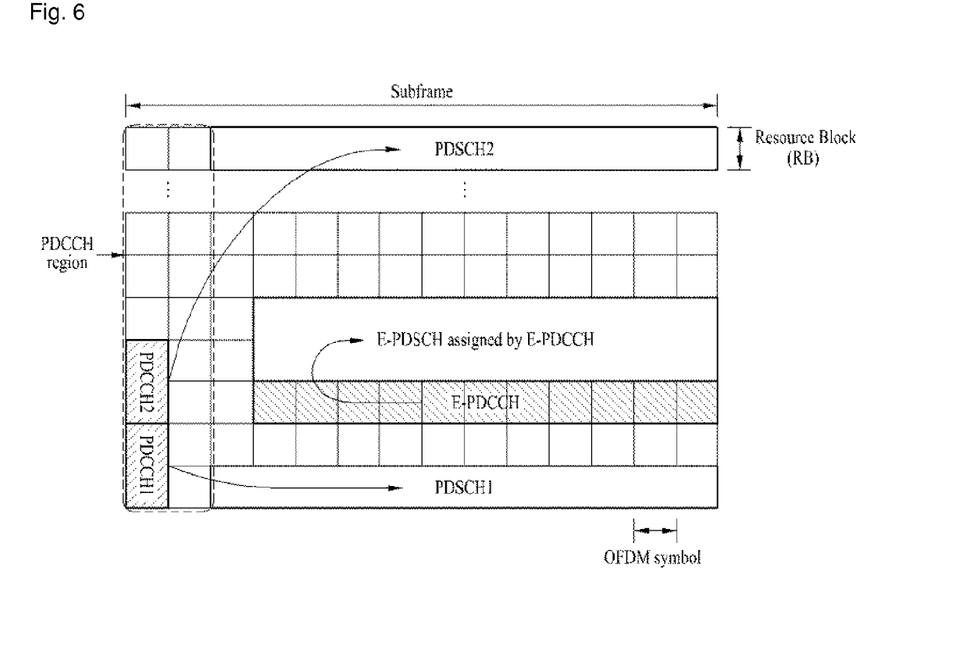
FIG. 6 is a diagram illustrating features of an E-PDCCH.

FIG. 6 is a diagram illustrating features of an E-PDCCH. Particularly, in FIG. 6, a region for the existing PDCCH and a PDSCH corresponding to the existing PDCCH are shown as compared with a region for the E-PDCCH and an E-PDSCH region corresponding to the E-PDCCH.

Referring to FIG. 6, lengths of frequency and time domains into which the E-PDCCH is mapped may be set in various manners. For example, the E-PDCCH may be configured from the fourth symbol to the last symbol, may be configured only after the fourth symbols of the first slot, or may be configured at the second slot only. Also, positions of DL grant and UL grant for the E-PDCCH may be configured in various manners. However, it is important that the E-PDCCH is designed so as not to overlap the existing PDCCH region, whereby interference does not occur.

The aforementioned E-PDCCH and E-PDSCH have a structural feature that can transmit data region control information unlike the existing subframe structure where control information is transmitted to a control region. This structural feature may be used to reduce inter-cell interference in a heterogeneous wireless network system that includes a macro cell and a pico cell as described above. For example, if an MBSFN subframe where control information and CRS exist at first two symbols only is set to ABS, the other region except for the first two symbols may be set to a subframe having no interference.

In a resource region where interference is limited, control information and data are preferably configured to be safely transmitted. For example, a data region where the E-PDCCH may exist, i.e., search space may previously be designated through RRC signaling, etc., and blind decoding may be performed for the data region only to decode the E-PDCCH.

However, unexpected interference may still occur in the data region, and the E-PDCCH may not be decoded normally due to change of search space configuration for the E-PDCCH. In this case, the system is preferably designed for robust operation that the PDCCH not the E-PDCCH is directly decoded to acquire resource information for the PDSCH.

Accordingly, the present invention suggests that a mode (hereinafter, referred to as fallback mode) for receiving a PDSCH or E-PDSCH by decoding a PDCCH, in addition to a mode (hereinafter, referred to as normal mode) for receiving E-PDSCH by decoding E-PDCCH.

In more detail, E-PDCCH based data transmission is performed in the normal mode, and the normal mode is switched to the PDCCH based fallback mode in a specific status to perform data transmission. Also, to switch the normal mode to the fallback mode, a subframe that can perform blinding decoding for the PDCCH should be designated. If the E-PDCCH is not received or decoding is failed, necessary information is obtained from the subframe that can perform blind decoding for the PDCCH. Although data transmission through the PDCCH may be performed for the same message as that of the E-PDCCH, it may be configured that data may be transmitted together with changed resource allocation information, etc.

As examples of the specific status, it may be considered a case where E-PDCCH receiving quality becomes lower than a threshold value, a case where E-PDCCH decoding failure or receiving failure is continued for a designated time period N times or more, and a case where N subframe or previously set time passes after E-PDCCH decoding failure occurs.

Also, a subframe that can perform blind decoding for the PDCCH in the fallback mode may be designated in a radio frame unit, or a specific subframe may be designated per integer multiple of a radio frame. Alternatively, a subframe (for example, SF#0 or SF#5) to which a broadcast channel is transmitted, or its associated subframe may be configured, and a specific subframe or subframe pattern may previously be designated by RRC signaling.

Figure 7:
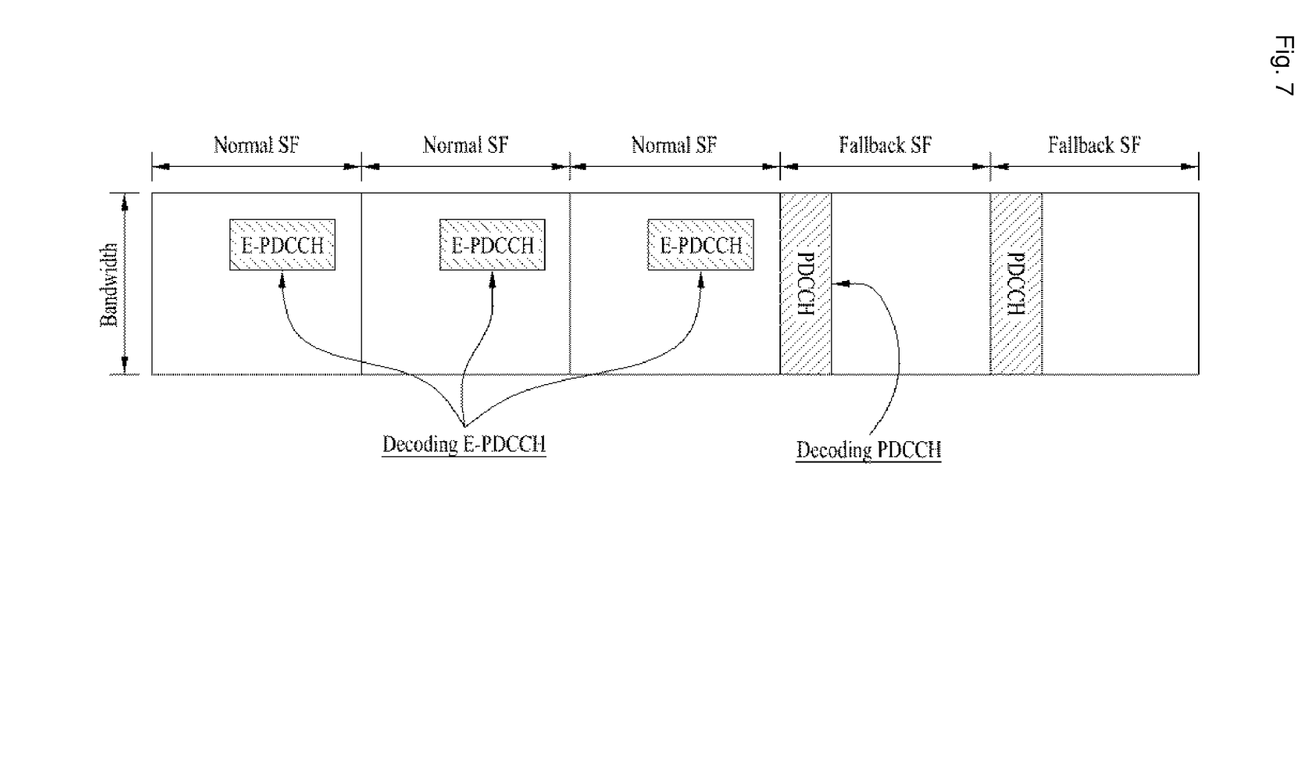
FIG. 7 is a diagram illustrating an example that a normal mode and a fallback mode are set in accordance with the embodiment of the present invention.

FIG. 7 is a diagram illustrating an example that a normal mode and a fallback mode are set in accordance with the embodiment of the present invention.

Referring to FIG. 7, a subframe operated in a normal mode, which receives E-PDSCH by decoding E-PDCCH, and a fallback subframe operated in a PDCCCH based fallback mode are set. In particular, the fallback subframe is the subframe that is difficult to receive the E-PDCCH or scheduled so as not to receive the E-PDCCH. This fallback subframe demodulates the PDSCH or the E-PDSCH by decoding the PDCCH.

In the mean time, the case where PDCCH is used and the case the E-PDCCH is used may be considered depending on features of the transmitted control information.

Figure 8:
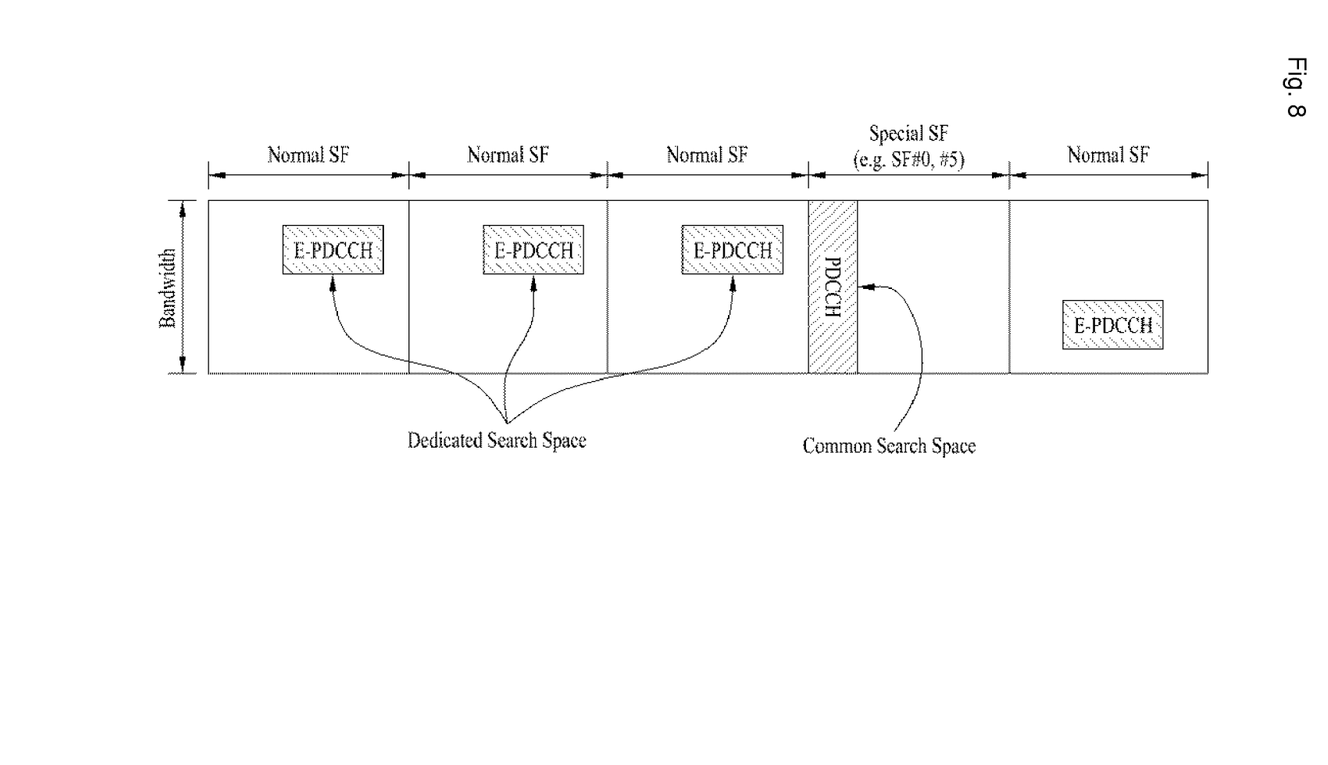
FIG. 8 is a diagram illustrating an example for dividing a case where a PDCCH is used from a case where an E-PDCCH is used depending on features of control information in accordance with the embodiment of the present invention.

FIG. 8 is a diagram illustrating an example for dividing a case where a PDCCH is used from a case where an E-PDCCH is used depending on features of control information in accordance with the embodiment of the present invention.

Referring to FIG. 8, at a specific subframe (for example, SF#0 or SF#5), system information, information related to change and update of important information such as cell selection/reselection, or other broadcast information (e.g., MIB message, SIB1 message, and SI messages) is transmitted through the PDCCH, and dynamic scheduling information such as uplink grant or downlink resource allocation information and information related to the dynamic scheduling information are transmitted through the E-PDCCH other than the specific subframe.

In this case, it is preferable that MIB message, SIB1 message, and SI messages are transmitted from a common search space of the LTE-A system through the PDCCH masked with SI-RNTI, P-RNTI, RA-RNTI, etc. The information transmitted through the PDCCH is not transmitted through the E-PDCCH. Also, as shown in FIG. 8, it is preferable that the search space for the E-PDCCH is configured by a dedicated search space not a common search space.

However, the search space for the E-PDCCH does not exclude that both the common search space and the dedicated search space exist. In this case, the designated specific subframe (SF#0 or SF#5) that receives the aforementioned important information may be set to acquire the corresponding important information by performing blind decoding in the common search space of the PDCCH not the common search space of the E-PDCCH. Likewise, dynamic scheduling information is transmitted from the dedicated search space for the E-PDCCH. In this case, there is no change in complexity of blind decoding.

Figure 9:
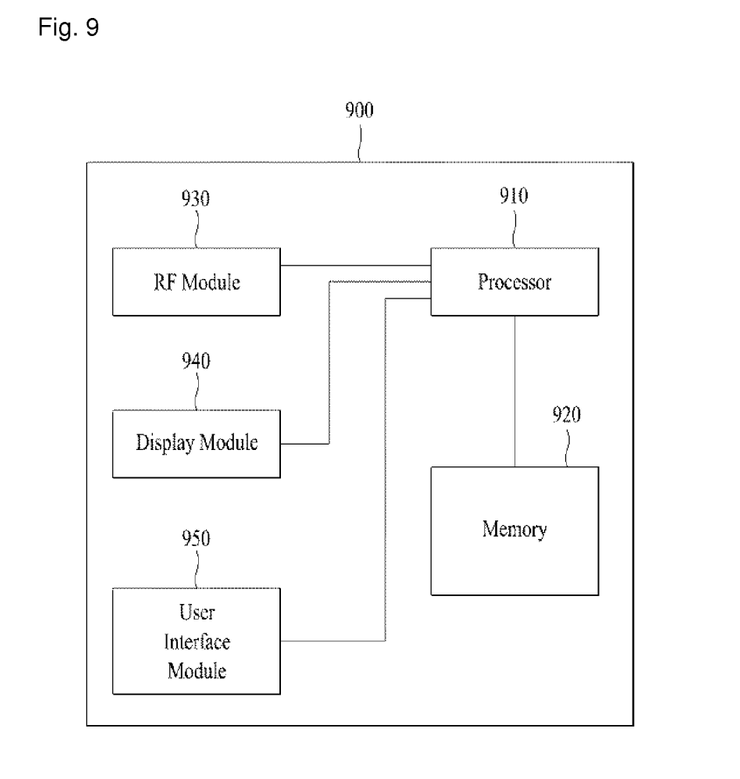
FIG. 9 is a block diagram illustrating a communication apparatus according to one embodiment of the present invention.

FIG. 9 is a block diagram illustrating a communication apparatus according to one embodiment of the present invention.

Referring to FIG. 9, the communication apparatus 900 includes a processor 910, a memory 920, a radio frequency (RF) module 930, a display module 940, and a user interface module 950.

The communication apparatus 900 is illustrated for convenience of description, and some of its modules may be omitted. Also, the communication apparatus 900 may further include necessary modules. Moreover, some modules of the communication apparatus 900 may be divided into segmented modules. The processor 910 is configured to perform the operation according to the embodiment of the present invention illustrated with reference to the drawings. In more detail, the detailed operation of the processor 910 will be understood with reference to the description of FIG. 1 to FIG. 8.

The memory 920 is connected with the processor 910 and stores an operating system, an application, a program code, and data therein. The RF module 930 is connected with the processor 910 and converts a baseband signal to a radio signal or vice versa. To this end, the RF module 930 performs analog conversion, amplification, filtering and frequency uplink conversion, or their reverse processes. The display module 940 is connected with the processor 910 and displays various kinds of information. Examples of the display module 940 include, but not limited to, well-known elements such as a liquid crystal display (LCD), a light emitting diode (LED), and an organic light emitting diode (OLED). The user interface module 950 is connected with the processor 910, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for transmitting and receiving downlink control information in a wireless communication system and the apparatus for the same have been described based on the 3GPP LTE system, they may be applied to various wireless communication systems in addition to the 3GPP LTE system.

The invention claimed is:

1. A method for receiving downlink channels in a user equipment (UE) at a wireless communication system from a base station, the method comprising:
configuring, by the UE, a common search space and a UE specific search space via a higher layer;
receiving, by the UE, a first downlink control channel by monitoring the common search space, or a second downlink control channel by monitoring the UE specific search space; and
receiving, by the UE, a broadcast channel based on information included in the first downlink control channel, or a downlink shared channel based on information included in the second downlink control channel,
wherein the first downlink control channel is monitored in subframes where the second downlink control channel is not monitored,
wherein subframes to receive the broadcast channel are configured via the higher layer,
wherein the second downlink control channel is not monitored in subframes configured to receive the broadcast channel, and
wherein the second downlink control channel is an enhanced physical downlink control channel (E-PDCCH).

2. The method according to claim 1, wherein, if the first downlink control channel includes information on the broadcast channel, the first downlink control channel is received by monitoring the common search space.

3. A user equipment (UE) in a wireless communication system, the user equipment comprising:
a wireless communication module configured to receive downlink channels from a base station; and
a processor configured to:
monitor a common search space to receive a first downlink control channel, or monitor a UE specific search space to receive a second downlink control channel, and
control the wireless communication module to receive a broadcast channel based on information included in the first downlink control channel, or a downlink shared channel based on information included in the second downlink control channel,
wherein the first downlink control channel is monitored in subframes where the second downlink control channel is not monitored,
wherein subframes to receive the broadcast channel are configured via a higher layer,
wherein the second downlink control channel is not monitored in subframes configured to receive the broadcast channel, and
wherein the second downlink control channel is an enhanced physical downlink control channel (E-PDCCH).

4. The UE according to claim 3, wherein, if the first downlink control channel includes information on the broadcast channel, the processor monitors the common search space to receive the first downlink control channel.

* * * * *